(12) United States Patent
McGory et al.

(10) Patent No.: US 10,661,833 B2
(45) Date of Patent: May 26, 2020

(54) VEHICLE BODY STRUCTURE

(71) Applicant: Nissan North America, Inc., Franklin, TN (US)

(72) Inventors: Michael McGory, West Bloomfield, MI (US); Patrick Grattan, Wixom, MI (US)

(73) Assignee: Nissan North America, Inc., Franklin, TN (US)

( * ) Notice: Subject to any disclaimer, the term of this patent is extended or adjusted under 35 U.S.C. 154(b) by 75 days.

(21) Appl. No.: 16/023,954

(22) Filed: Jun. 29, 2018

(65) Prior Publication Data
US 2020/0001927 A1    Jan. 2, 2020

(51) Int. Cl.
| | | |
|---|---|---|
| *B62D 21/15* | (2006.01) | |
| *B62D 21/03* | (2006.01) | |
| *B62D 27/02* | (2006.01) | |

(52) U.S. Cl.
CPC ........... *B62D 21/152* (2013.01); *B62D 21/03* (2013.01); *B62D 21/157* (2013.01); *B62D 27/023* (2013.01)

(58) Field of Classification Search
CPC .... B62D 21/152; B62D 21/03; B62D 21/157; B62D 27/023
See application file for complete search history.

(56) References Cited

U.S. PATENT DOCUMENTS

| | | | |
|---|---|---|---|
| 4,225,167 A | 9/1980 | Buettner et al. | |
| 5,125,715 A | 6/1992 | Kijima | |
| 6,409,239 B1 | 6/2002 | Tjoelker et al. | |
| 6,604,884 B1 | 8/2003 | Ohkura | |
| 6,813,818 B2 | 11/2004 | Schmidt | |
| 7,137,658 B2 | 11/2006 | Haneda et al. | |
| 7,819,218 B2 | 10/2010 | Eichberger et al. | |
| 7,900,983 B2 | 3/2011 | Saitou | |
| 8,398,153 B1 | 3/2013 | Dandekar et al. | |
| 8,590,950 B2 | 11/2013 | Hermanson et al. | |
| 8,764,096 B2 | 7/2014 | Han et al. | |
| 8,870,267 B2 | 10/2014 | Zischke et al. | |
| 8,985,258 B1 | 3/2015 | Midoun et al. | |
| 8,985,671 B1 | 3/2015 | Lei et al. | |
| 9,056,634 B2 | 6/2015 | Watanabe | |

(Continued)

FOREIGN PATENT DOCUMENTS

| | | |
|---|---|---|
| DE | 102013003911 A1 | 9/2014 |
| DE | 102014223633 A | 5/2016 |

(Continued)

OTHER PUBLICATIONS

U.S. Appl. No. 15/404,383; Vehicle Body Structure; P Grattan; filed Jan. 12, 2017.

(Continued)

*Primary Examiner* — Lori L Lyjak
(74) *Attorney, Agent, or Firm* — Global IP Counselors, LLP

(57) ABSTRACT

A vehicle body structure includes a first structural member extending in a vehicle lateral direction and a second structural member extending in a vehicle longitudinal direction. The second structural member is connected to the first structural member. An off-center impact structure is connected to at least one of the first structural member and the second structural member. The off-center impact structure has a curved contact surface. The curved contact surface is laterally spaced from the other of the first structural member and the second structural member.

20 Claims, 8 Drawing Sheets

(56) References Cited

U.S. PATENT DOCUMENTS

| | | |
|---|---|---|
| 9,061,713 B2 | 6/2015 | Hashimoto et al. |
| 9,067,549 B2 | 6/2015 | Baccouche et al. |
| 9,079,619 B2 | 7/2015 | Gupta et al. |
| 9,180,828 B2 | 11/2015 | Sakakibara et al. |
| 9,180,913 B2 | 11/2015 | Ameloot et al. |
| 9,180,915 B2 | 11/2015 | Kim |
| 9,193,318 B2 | 11/2015 | Barbat et al. |
| 9,211,915 B2 | 12/2015 | Abe et al. |
| 9,233,716 B2 | 1/2016 | Midoun et al. |
| 9,266,485 B2 | 2/2016 | Kuriyama et al. |
| 9,272,678 B2 | 3/2016 | Nam et al. |
| 9,272,679 B1 | 3/2016 | Ramoutar et al. |
| 9,290,138 B2 | 3/2016 | Muraji et al. |
| 9,394,003 B2 | 7/2016 | Matsumoto et al. |
| 9,415,805 B2 | 8/2016 | Fujikawa et al. |
| 9,421,927 B2 | 8/2016 | Basappa et al. |
| 9,527,463 B2 | 12/2016 | Ramoutar et al. |
| 9,676,416 B2 | 6/2017 | Kitakata et al. |
| 9,771,106 B2 | 9/2017 | Ogawa et al. |
| 9,855,971 B2 | 1/2018 | Daido et al. |
| 9,908,564 B1 | 3/2018 | Grattan |
| 10,086,784 B2 | 10/2018 | Duffe |
| 10,494,029 B2 | 12/2019 | Tanabe et al. |
| 2008/0023954 A1 | 1/2008 | Eichberger et al. |
| 2009/0174200 A1 | 7/2009 | LaTurner et al. |
| 2009/0256389 A1 | 10/2009 | Kosaka |
| 2009/0302591 A1 | 12/2009 | Auer et al. |
| 2011/0083923 A1 | 4/2011 | Ajisaka |
| 2015/0021935 A1 | 1/2015 | Baccouche et al. |
| 2015/0298742 A1 | 10/2015 | Ono et al. |
| 2015/0329144 A1 | 11/2015 | Hara |
| 2015/0336525 A1 | 11/2015 | Nam et al. |
| 2015/0360633 A1 | 12/2015 | Nishida et al. |
| 2016/0280271 A1 | 9/2016 | Kibben et al. |
| 2017/0225713 A1 | 8/2017 | Brandhuber et al. |
| 2018/0065669 A1 | 3/2018 | Ghislieri et al. |

FOREIGN PATENT DOCUMENTS

| | | |
|---|---|---|
| EP | 1278674 B1 | 5/2006 |
| EP | 2487055 A1 | 8/2012 |
| EP | 2851272 A1 | 3/2015 |
| EP | 2930068 A1 | 10/2015 |
| JP | S5966575 A | 4/1984 |
| JP | H0725357 A | 1/1995 |
| WO | 03-051654 A1 | 6/2003 |
| WO | 2014112596 A1 | 7/2014 |
| WO | 2015019167 A1 | 2/2015 |
| WO | 2015074753 A1 | 5/2015 |

OTHER PUBLICATIONS

U.S. Appl. No. 15/966,898; Vehicle Body Structure; P Grattan; filed Apr. 30, 2018.

U.S. Appl. No. 15/404,334; Vehicle Body Structure; P Grattan; filed Jan. 12, 2017.

U.S. Appl. No. 15/404,349; Vehicle Body Structure; P Grattan; filed Jan. 12, 2017.

U.S. Appl. No. 15/404,365; Vehicle Body Structure; P Grattan; filed Jan. 12, 2017.

International Search Report and Written Opinion in PCT/US19/22333 dated Jun. 10, 2019.

VEHICLE BODY STRUCTURE

BACKGROUND

Field of the Invention

The present invention generally relates to a vehicle body structure. More specifically, the present invention relates to an off-center impact structure attached to a portion of a vehicle frame that responds to and absorbs impact force during an off-center impact.

BACKGROUND INFORMATION

Vehicle structures often include structural features that absorb impact forces generated during an impact event.

SUMMARY

One object of the disclosure is to provide a vehicle body structure that absorbs and redirects impact energy during an off-center impact.

In view of the state of the known technology, one aspect of the present disclosure is to provide a vehicle body structure including a first structural member extending in a vehicle lateral direction and a second structural member extending in a vehicle longitudinal direction. The second structural member is connected to the first structural member. An off-center impact structure is connected to at least one of the first structural member and the second structural member. The off-center impact structure has a curved contact surface. The curved contact surface is laterally spaced from the other of the first structural member and the second structural member.

Another aspect of the present invention includes a vehicle body structure including a first structural member extending in a vehicle lateral direction and a second structural member extending in a vehicle longitudinal direction and connected to the first structural member. An off-center impact structure is connected to at least one of the first structural member and the second structural member. The off-center impact structure has a curved contact surface. A load distributing member is connected to the off-center impact structure. The load distributing member is laterally spaced from the other of the first structural member and the second structural member. A reinforcing member is disposed in the second structural member such that a line extending parallel to the first structural member passes through the off-center impact structure and the reinforcing member.

Also other objects, features, aspects and advantages of the disclosed vehicle body structure will become apparent to those skilled in the art from the following detailed description, which, taken in conjunction with the annexed drawings, discloses exemplary embodiments of the vehicle body structure.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
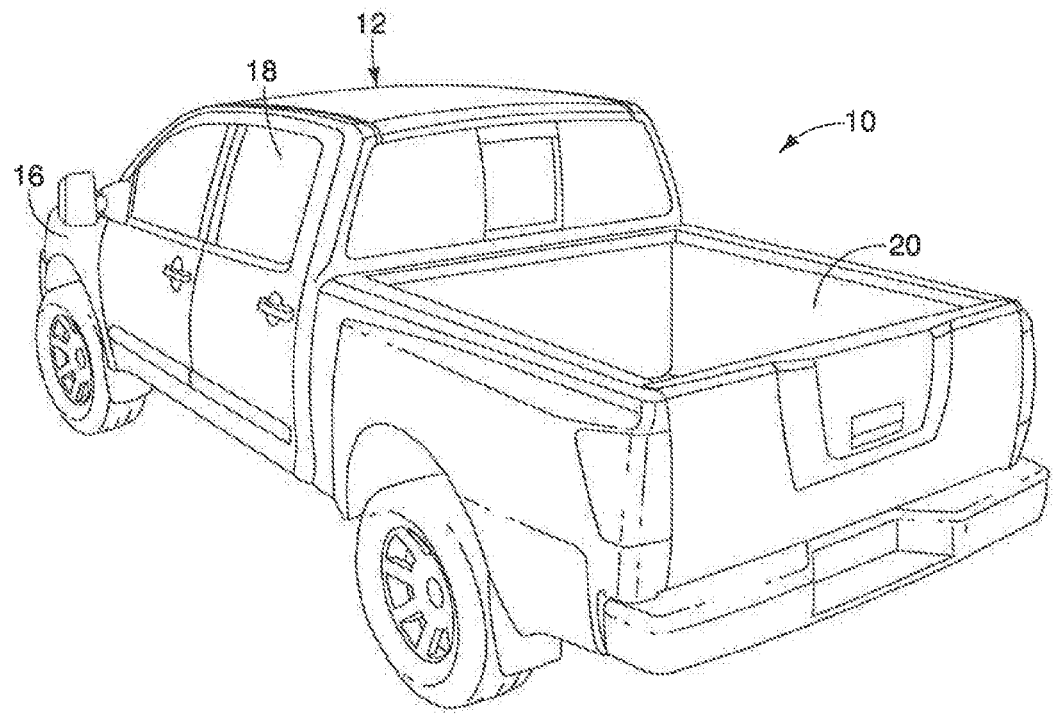
FIG. 1 is a perspective view of a vehicle including an off-center impact structure in accordance with an exemplary embodiment of the present invention.
Figure 2:
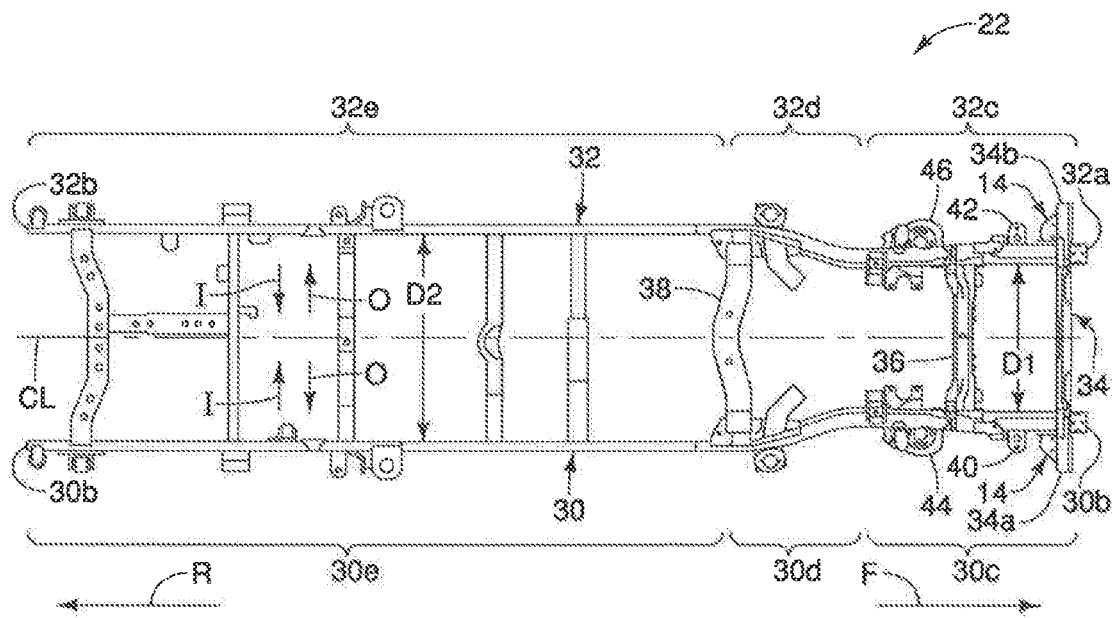
FIG. 2 is a top view of a frame of the vehicle of FIG. 1 illustrating an off-center impact structure attached to each of the frame side-members.

Referring initially to FIGS. 1 and 2, a vehicle 10 with a vehicle body structure 12 that includes an off-center impact structure 14 (FIG. 2), is illustrated in accordance with an exemplary embodiment.

In FIG. 1, the vehicle 10 is depicted as a pickup truck that includes the vehicle body structure 12 and defines, for example, an engine compartment 16, a passenger compartment 18 and a cargo area 20. The vehicle body structure 12 is installed to and rests on a frame 22. The frame 22 and/or portions thereof are shown removed from the vehicle 10 in FIGS. 2-11. Specifically, FIG. 2 shows the frame 22 with a pair of the off-center impact structures 14 installed thereto. The off-center impact structures 14 are disposed on opposite sides of the frame 22. FIGS. 3-11 illustrate only a front area of one side of the frame 22 with the off-center impact structure 14 attached thereto.

In FIG. 1, the depicted pickup truck that defines the vehicle 10 is a heavy-duty vehicle intended to haul large and/or heavy materials. The frame 22 is therefore a rigid, strong structure able to withstand heavy duty usage. However, it should be understood from the drawings and the description herein, that the frame 22 and the off-center impact structures 14 described below can be configured for smaller vehicles or larger vehicles and is not limited to usage with a heavy-duty vehicle, such as the vehicle 10.

In other words, the off-center impact structure 14 can be used on any size vehicle that includes a frame, such as the frame 22, where the vehicle body structure 12 attaches to and is supported by the frame 22. It should also be understood from the drawings and description, that the off-center impact structure 14 can also be employed with a unibody vehicle. A unibody vehicle is a vehicle that does not typically include a separate frame, such as the frame 22. Rather, the unibody vehicle includes various structural elements welded together. Elements of the unibody vehicle serve as frame elements functionally equivalent to the elements of the frame 22. For example, U.S. Pat. No. 8,870,267, assigned to Nissan North America, discloses a unibody vehicle body structure. The front structural support portions 30 disclosed in U.S. Pat. No. 8,870,267 are basically vehicle side-members, such as those of the frame 22 (described in greater detail below). U.S. Pat. No. 9,180,913, also assigned to Nissan North America, also discloses a unibody vehicle body structure and further discloses an engine cradle. The elements of the off-center impact structure 14 can be installed to portions of the unibody vehicle disclosed in U.S. Pat. No. 8,870,267 and portions of the engine cradle of U.S. Pat. No. 8,870,267. Both U.S. Pat. Nos. 8,870,267 and 9,180,913 are incorporated herein by reference in their entirety. Since unibody vehicles are conventional structures, further description thereof is omitted for the sake of brevity.

In FIG. 2 several directions relative to the frame 22 (and the vehicle 10) are shown in order to define orientations of the various features of the vehicle 10 and the off-center impact structure 14. Specifically, the vehicle 10 and the frame 22 define a longitudinal center line CL that extends in a lengthwise direction of the vehicle 10 along a central portion of the vehicle 10. At a right-hand side of FIG. 2, a forward direction F is indicated by the depicted arrow, and at a left-hand side of FIG. 2 a rearward direction R is indicated by the depicted arrow. Inboard directions I and outboard directions O relative to the longitudinal center line CL are also shown in FIG. 2.

As shown in FIG. 2, the frame 22 includes a first side-member 30 (i.e., a second structural member), a second side-member 32, and a first cross-member 34 (i.e., a first structural member). The frame can include additional cross-members disposed rearward of the first cross-member 34 between the first and second side-members 30 and 32, such as a second cross-member 36 and a third cross-member 38. The frame 22 is made of heavy gauge steel, but can alternatively be made of other materials depending upon the overall design of the vehicle 10. It should therefore be understood that the first side-member 30 extends along and under a passenger's side of the vehicle 10, and the second side-member 32 extends along and under a driver's side of the vehicle 10.

The first side-member 30 is an elongated beam (also referred to as a structural member) that has multiple contours and shapes. The first side-member 30 extends in a vehicle longitudinal direction. Specifically, the first side-member 30 has a front end 30a and a rear end 30b. The first side-member 30 also has a first portion 30c, a second portion 30d and a third portion 30e. The first portion 30c extends in the rearward direction R from the front end 30a to a location proximate where the first side-member 30 bends outwardly. The first portion 30c is generally straight. The second portion 30d has a curved shape such that just rearward of the first portion 30c, the second portion 30d gradually curves in the outboard direction O. The third portion 30e is generally straight, but can include contours and curves, depending upon the overall design of the vehicle 10.

Similarly, the second side-member 32 is an elongated beam that has multiple contours and shapes that are symmetrical to the first side-member 30. The second side-member 32 extends in the vehicle longitudinal direction. Specifically, the second side-member 32 has a front end 32a and a rear end 32b. The second side-member 32 also has a first portion 32c, a second portion 32d and a third portion 32e. The first portion 32c extends in the rearward direction R from the front end 32a to a location proximate where the second side-member 32 bends outwardly. The first portion 32c is generally straight. The second portion 32d has a curved shape such that just rearward of the first portion 32c, the second portion 32d gradually curves in the outboard direction O. The third portion 32e is generally straight, but can include contours and curves, depending upon the overall design of the vehicle 10.

The first portions 30c and 32c of the first and second side-members 30 and 32 are a first distance D1 away from one another, and the third portions 30e and 32e are a second distance D2 away from one another. The second distance D2 is greater than the first distance D1.

The first and second side-members 30 and 32 each include body attachment structures 40 and 42 (also referred to as attachment flanges). The body attachment structures 40 and 42 are welded to the first and second side-members 30 and 32 and are dimensioned and shaped to attach to the vehicle body structure 12 of the vehicle 10. The body attachment structures 40 and 42 extend from outboard sides of the first portions 30c and 32c of the first and second side-members 30 and 32 rearward of the first cross-member 34. The body attachment structures 40 and 42 extend from outboard sides of the second portions 30d and 32d of the first and second side-members 30 and 32 between the first cross-member 34 and the second cross-member 36. As shown in FIG. 2, the body attachment structures 40 and 42 are disposed rearward of the off-center impact structures 14.

Although not shown in FIG. 2, the third portions 30e and 32e of the first and second side-members 30 and 32 can also include additional body attachment structures configured for attachment to structures that define the cargo area 20 of the vehicle 10. Further, the third portions 30e and 32e can be at the same level above the ground as the first portions 30c and 32c, or, can be raised above the ground at a level higher that the first portions 30c and 32c, with the second portions 30d and 32d including an upward curvature.

As shown in FIG. 2, each of the first portions 30c and 32c of the first and second side-members 30 and 32 further include front suspension structures, such as coil spring supports 44 and 46. The coil spring supports 44 and 46 are rigidly fixed, such as by welding, to respective ones of the first and second side-members 30 and 32. The coil spring supports 44 and 46 are dimensioned and shaped to support lower ends of front suspension coil springs in a conventional manner. Because front suspension coil springs are conventional structures, further description is omitted for the sake of brevity.

The engine compartment 16 of the vehicle body structure 12 is approximately located in the space above and between the first portions 30c and 32c of the first and second side-members 30 and 32. A front portion of the passenger compartment 18 is located in the space above and between the second portions 30d and 32d of the first and second side-members 30 and 32 rearward of the engine compartment 16. The remainder of the passenger compartment 18 and the cargo area 20 of the vehicle body structure 12 are located above the third portions 30e and 32e of the first and second side-members 30 and 32.

The first cross-member 34 is welded or otherwise rigidly fixed proximate the front ends 30a and 32a of the first and second side-members 30 and 32. The first cross-member 34 extends in a vehicle lateral direction. A bumper structure (not shown) can be attached to the first cross-member 34. The first cross-member 34 is connected to the first side-member 30 at or adjacent to the front end 30a of the first side-member 30. The first cross-member 34 includes a first outboard portion 34a that extends from the first side-member 30 in the outboard direction O. The first cross-member 34 includes a second outboard portion 34b that extends from the second side-member 30 in the outboard direction O. In response to an impact event of a small overlap impact test, the outboard portion 34a of the first cross-member 34 deforms such that the off-center impact structure 14 contacts the first side-member 30, as described in greater detail below. Similarly, in response to an impact event of a small overlap impact test, the outboard portion 34b of the first cross-member 34 deforms such that the off-center impact structure 14 contacts the second side-member 32.

A description of an exemplary embodiment of the off-center impact structure 14 is now provided with specific reference to FIGS. 2-11. As is shown in FIG. 2, one of the off-center impact structures 14 is attached to the first cross-member 34 on an outboard side of the first side-member 30, and another one of the off-center impact structures 14 is installed to the first cross-member 34 on an outboard side of the second side-member 32. The two off-center impact structures 14 are symmetrically arranged relative to the longitudinal center line CL of the vehicle 10. The two off-center impact structures 14 are substantially identical, except that they are mirror images of one another. Consequently, description of one of the off-center impact structures 14 applies equally to the other. Therefore, only one of the off-center impact structures 14 is described herein below for the sake of brevity. In FIGS. 3-11, the off-center impact structure 14 is shown and described as being connected to the first outboard portion 34a of the first cross-member 34. The following description is equally applicable to the off-center impact structure 14 being connected to the second outboard portion 34b of the first cross-member 34.

Figure 15:
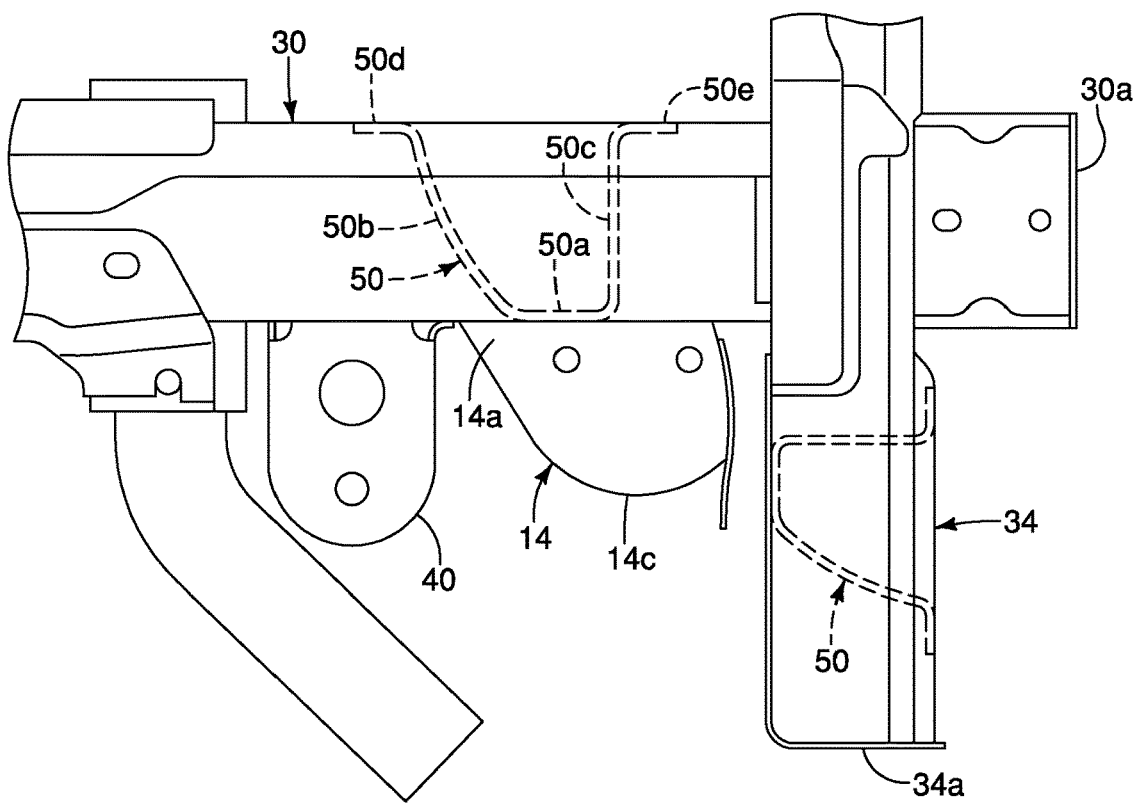
FIG. 15 is an enlarged top view similar to FIG. 3 with an off-center impact structure connected to a side-member.

Alternatively, the off-center impact structures 14 can be connected to each of the first and second side-members 30 and 32 rearward of the respective outboard portions 34a and 34b of the first cross-member 34 instead of to the first and second outboard portions 34a and 34b of the first cross-member 34, as shown in FIG. 15. The reinforcing member 50 can be disposed in both the first and second side-members 30 and 32 and in the first cross-member 34, or can be disposed in only one of the side-member and the cross-member.

Figure 16:
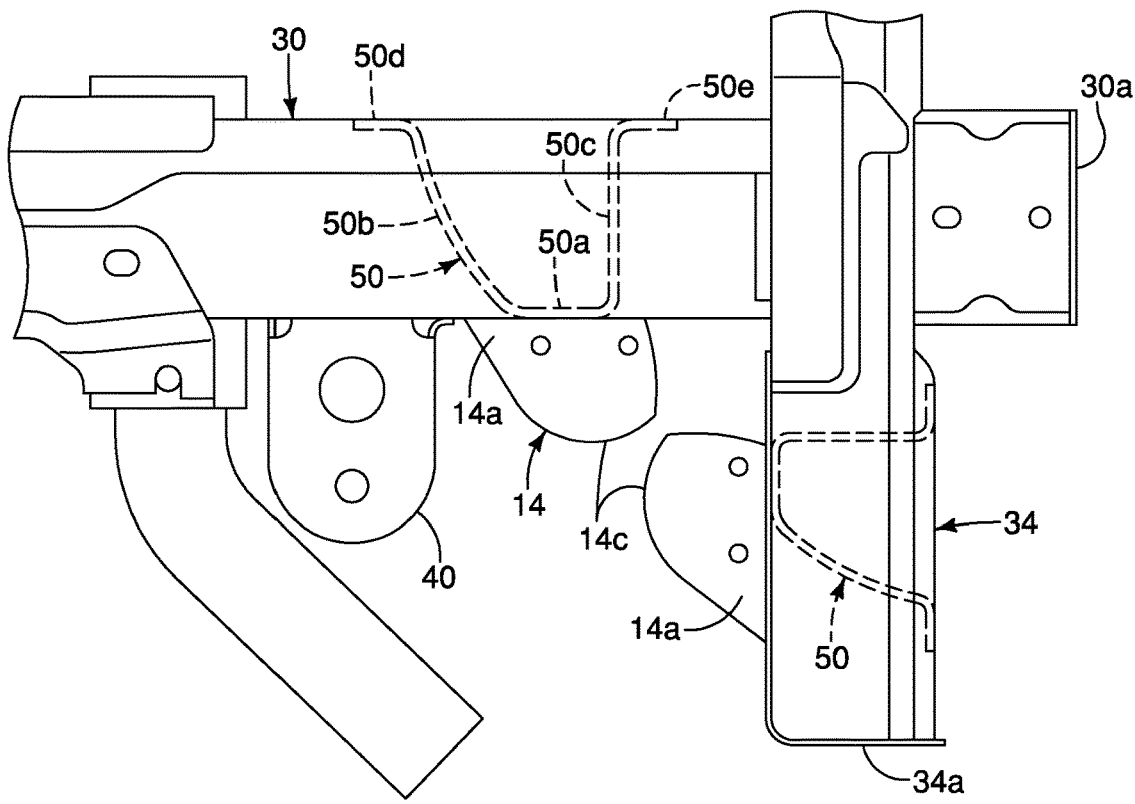
FIG. 16 is an enlarged top view similar to FIG. 3 with an off-center impact structure connected to the cross-member and an off-center impact structure connected to the side-member.

Alternatively, the off-center impact structures 14 can be connected to both the outboard portions 34a and 34b of the first cross-member 34 and to the first and second side members 30 and 32, as shown in FIG. 16. The reinforcing member 50 can be disposed in both the first and second side-members 30 and 32 and in the first cross-member 34, or can be disposed in only one of the side-member and the cross-member.

Figure 3:
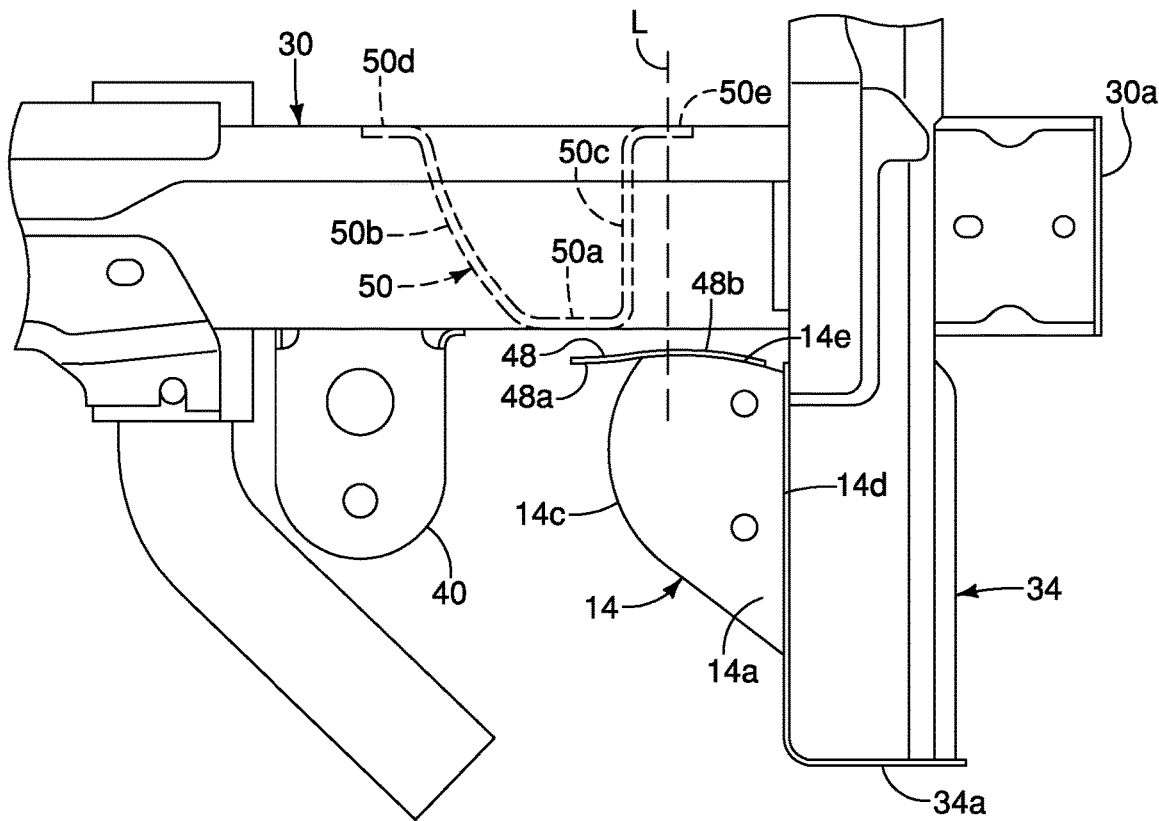
FIG. 3 is an enlarged top view of the off-center impact structure of FIG. 2.
Figure 13:
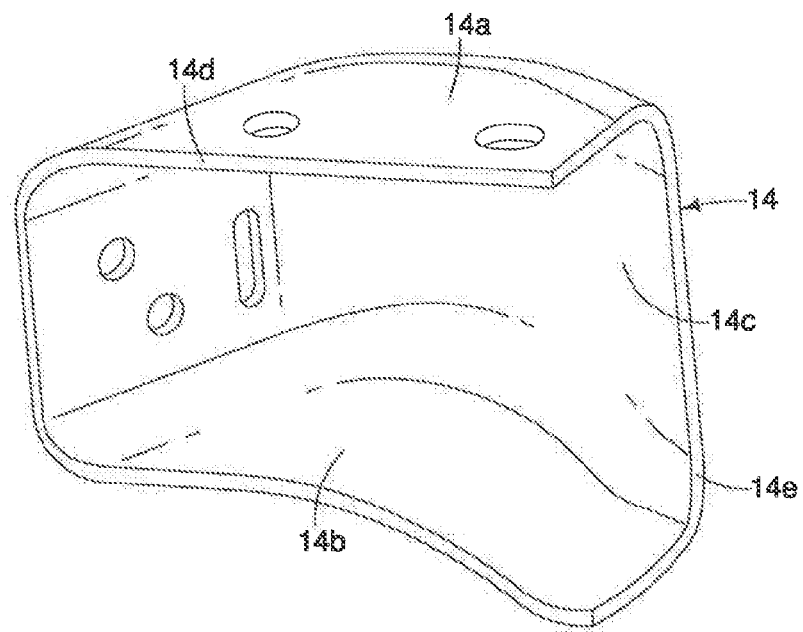
FIG. 13 is a perspective view of the off-center impact structure of FIG. 2.

As shown in FIGS. 2-11, the off-center impact structure 14 is connected to the first cross-member 34. The off-center impact structure 14 has a first, or upper, surface 14a and a second, or lower, surface 14b, as shown in FIG. 13. A curved contact surface 14c extends between the first and second surfaces 14a and 14b. The curved contact surface 14c preferably has an involute shape. A first attachment surface 14d is formed by the first and second surfaces 14a and 14b and the curved contact surface 14c. A second attachment surface 14e is formed by the first and second surfaces 14a and 14b and the curved contact surface 14c and is disposed substantially perpendicularly to the first attachment surface 14d. The first attachment surface 14d is connected to the first cross-member 34, as shown in FIG. 3. The second attachment surface 14e is laterally spaced from the first side-member 30. The curved contact surface 14c is spaced from the first side-member 30. In other words, no portion of the off-center impact structure 14 directly contacts the first side-wall member 30 when the off-center impact structure 14 is connected to the first cross-member 34 and prior to an impact event. The off-center impact structure 14 is preferably made of steel, such as stainless steel. Preferably, the off-center impact structure 14 is integrally formed as a one-piece member, such as by stamping.

Figure 6:
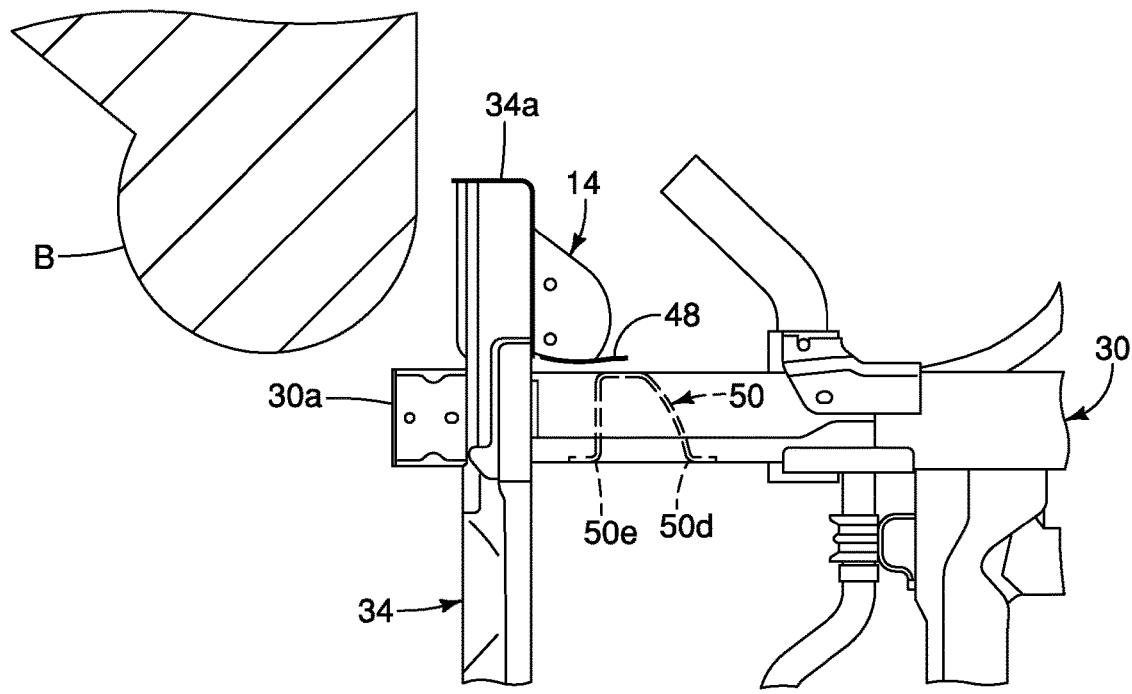
FIG. 6 is a top view of the off-center impact structure prior to contact with a barrier during a small overlap impact test.

A load distributing member 48 is connected to the second attachment surface, as shown in FIG. 3. The load distributing member 48 has a first surface 48a connected to the second attachment surface 14e of the off-center impact structure 14. A second surface 48b of the load distributing member 48 is configured to contact the first side-member 30 during a small overlap impact test, as shown in FIGS. 6-11. The second surface 48b preferably faces in an opposite direction as the first surface 48a, as shown in FIG. 6. The load distributing member 48 is preferably made of steel, such as stainless steel. The load distributing member 48 is preferably integrally formed as a one-piece member. The load distributing member 48 is connected to the off-center impact structure 14 in any suitable manner, such as by welding.

As shown in FIGS. 3 and 6-12, the first side-member 30 defines a hollow interior. A reinforcing member 50 is disposed in the hollow interior of the first side-member 30, as shown in FIG. 3. Preferably, the reinforcing member 50 is substantially U-shaped. The reinforcing member 50 has a middle portion 50a from which first and second legs 50b and 50c extend. A first end 50d of the first leg 50b is connected to an inner lateral side of the interior of the first side-member 30. A second end 50e of the second leg 50c is connected to the inner lateral side of the interior of the first side-member 30. The middle portion 50a is connected to an outer lateral side of the interior of the first side-member 30. As shown in FIG. 3, the middle portion 50a of the reinforcing member 50 is disposed nearer the off-center impact structure 14 and the load distributing member 48 than the first and second ends 50d and 50e. The middle portion 50a, the first end 50d and the second end 50e of the reinforcing member are rigidly connected to the interior of the first side-member 30 in any suitable manner, such as by welding. The reinforcing member 50 is preferably made of steel, such as stainless steel. The reinforcing member 50 is preferably integrally formed as a one-piece member.

Referring to FIG. 3, the off-center impact structure 14 is connected to the first cross-member 34 such that the first attachment surface 14d directly contacts the first cross-member 34, thereby rigidly fixing the first and second surfaces 14a and 14b of the off-center impact structure 14 to the first cross-member 34. The off-center impact structure 14 extends rearwardly from the first cross-member 34. Preferably, the first attachment surface 14d is welded to the first cross-member 34, thereby rigidly connecting the off-center impact structure 14 to the first cross-member 34. As shown in FIG. 2, the first side-member 30 is disposed between the off-center impact structure 14 and the longitudinal center line CL of the vehicle in a lateral direction of the vehicle. The curved contact surface 14c is spaced from the first side-member 30, as shown in FIG. 3. A height of the off-center impact structure 14 is preferably at least as large as a height of the first side-member 30.

Figure 4:
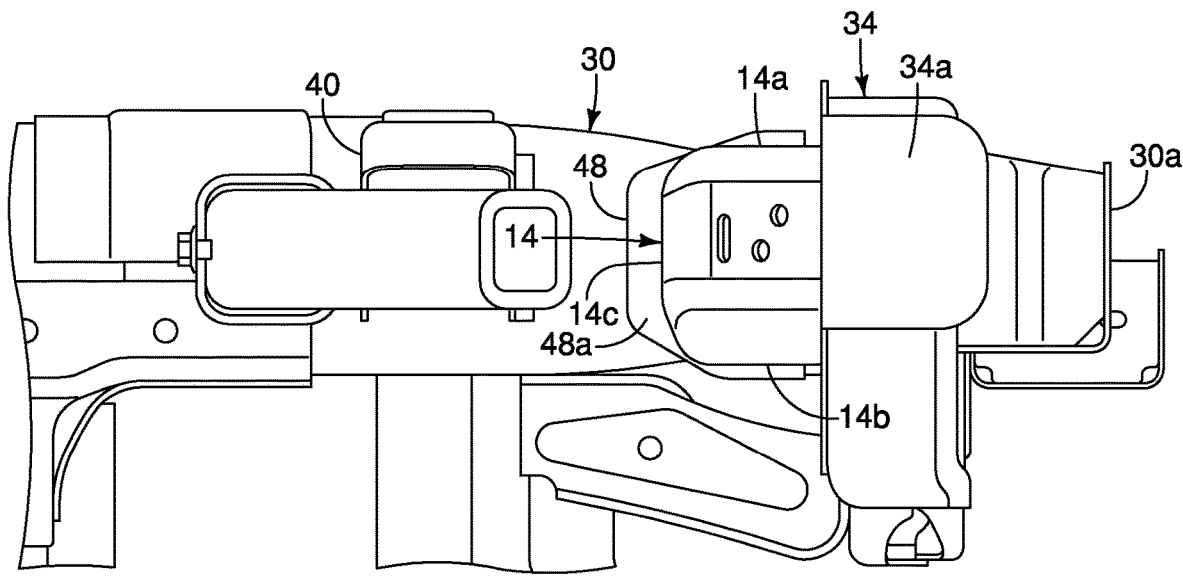
FIG. 4 is an elevational view of the off-center impact structure of FIG. 2.
Figure 5:
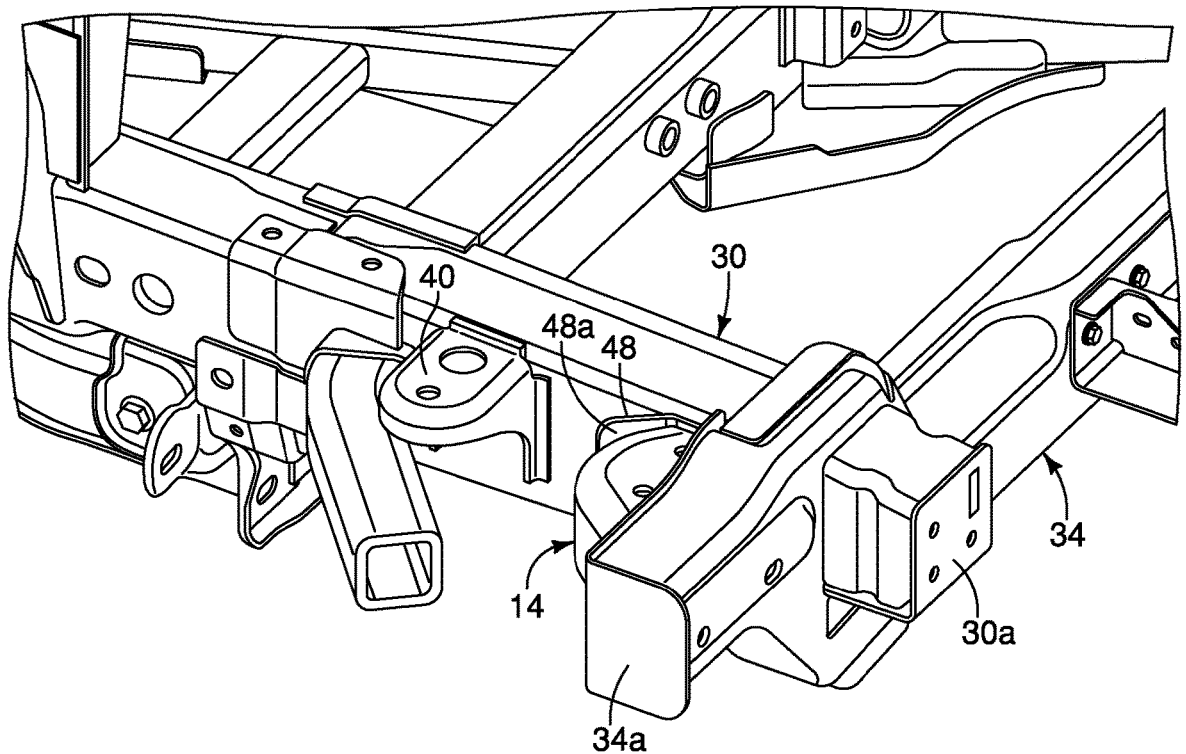
FIG. 5 is a perspective view of the off-center impact structure of FIG. 2.

The load distributing member 48 is connected to the second attachment surface 14e of the off-center impact structure 14, as shown in FIG. 3, in any suitable manner, such as by welding. The load distributing member 48 extends further rearwardly in the vehicle longitudinal direction then the off-center impact structure 14. The load distributing member 48 extends above and below the off-center impact structure 14, as shown in FIG. 4. The load distributing member 48 is disposed between the impact structure 14 and the first side-member 30 in a lateral direction of the vehicle in a top plan view, as shown in FIG. 3. The load distributing member 48 is laterally spaced from the first side-member 30 when the off-center impact structure 14 is connected to the first cross-member and prior to an impact event. A hollow interior is defined within the off-center impact structure 14 by the first and second surfaces 14 and 14b and the curved contact surface 14c of the off-center impact structure 14, the first cross-member 34 and the load distributing member 48.

The reinforcing member 50 is rigidly fixed within the interior of the first side-member 30, as shown in FIG. 3, such that the reinforcing member 50 reinforces the first side-member 30 in the lateral direction without substantially reinforcing the first side-member 30 in the longitudinal direction. A virtual line L extending parallel to the first cross-member 34 passes through the off-center impact structure 14, the load distributing member 48 and the reinforcing member 50.

As shown in FIGS. 6-11, the off-center impact structure 14 is configured to absorb impact energy in response to contact with a fixed barrier B with the vehicle 10 in motion. Specifically, FIG. 6 illustrates the off-center impact structure 14 just prior to an impact event and FIGS. 7-11 illustrate the off-center impact structure 14 during the impact event. The off-center impact structure 14 absorbs energy and distributes stress during the impact event in a manner described in greater detail below.

Figure 7:
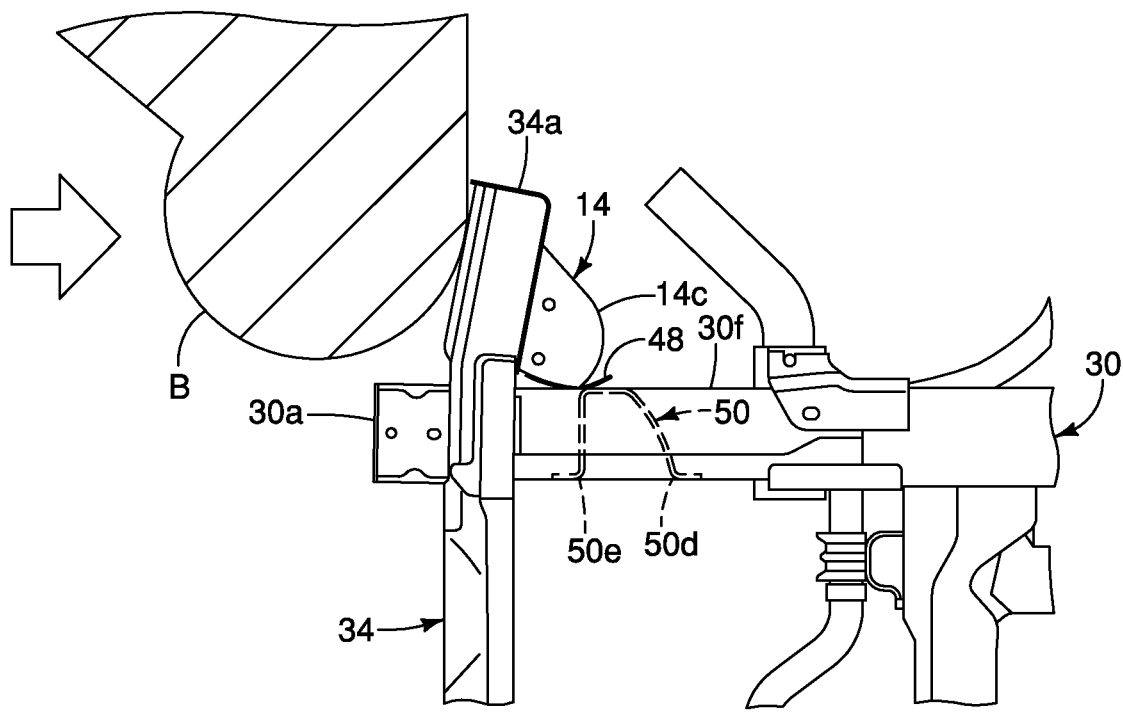
FIGS. 7-11 are top views of the off-center impact structure during the small overlap impact test illustrating impact with the barrier of FIG. 6.
Figure 8:
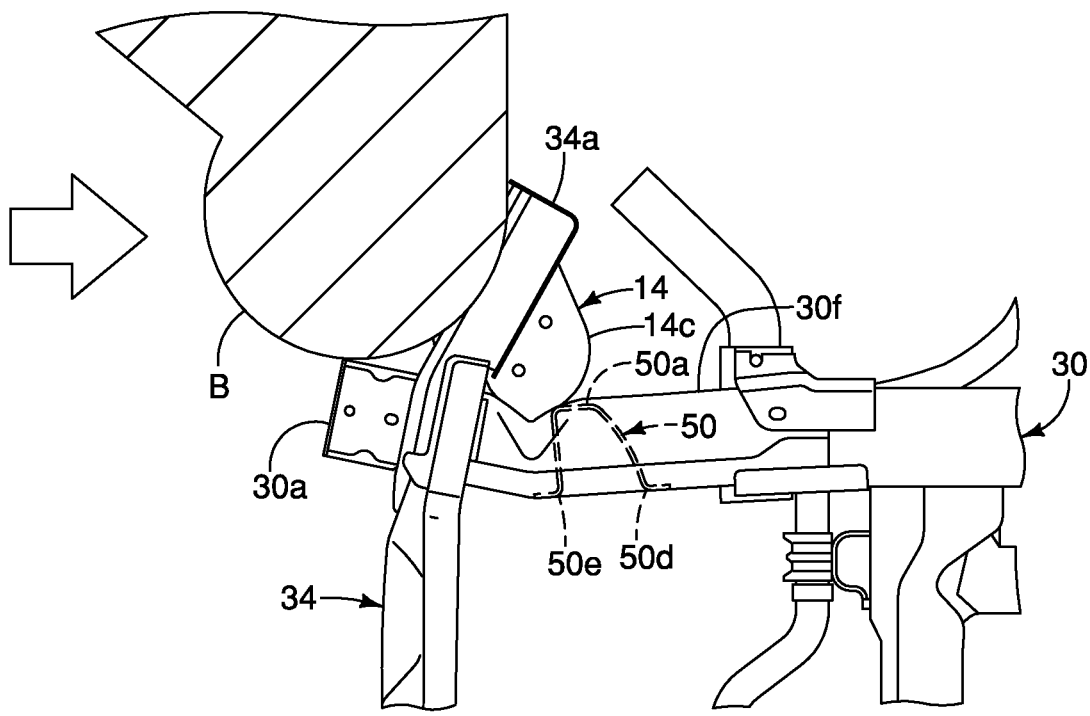
Figure 9:
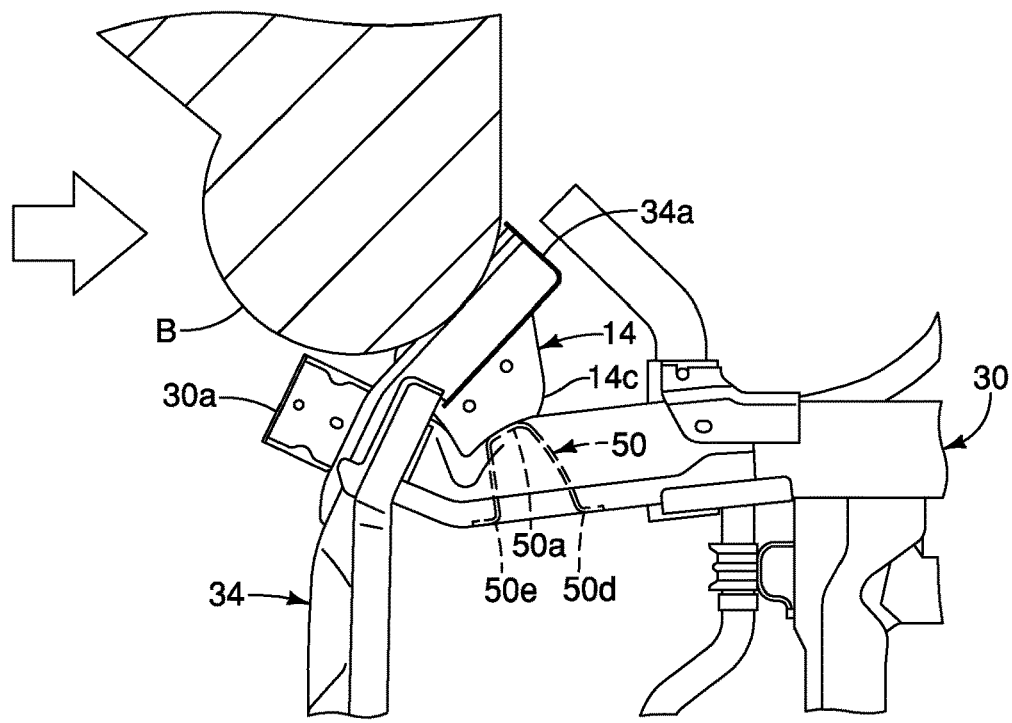
Figure 10:
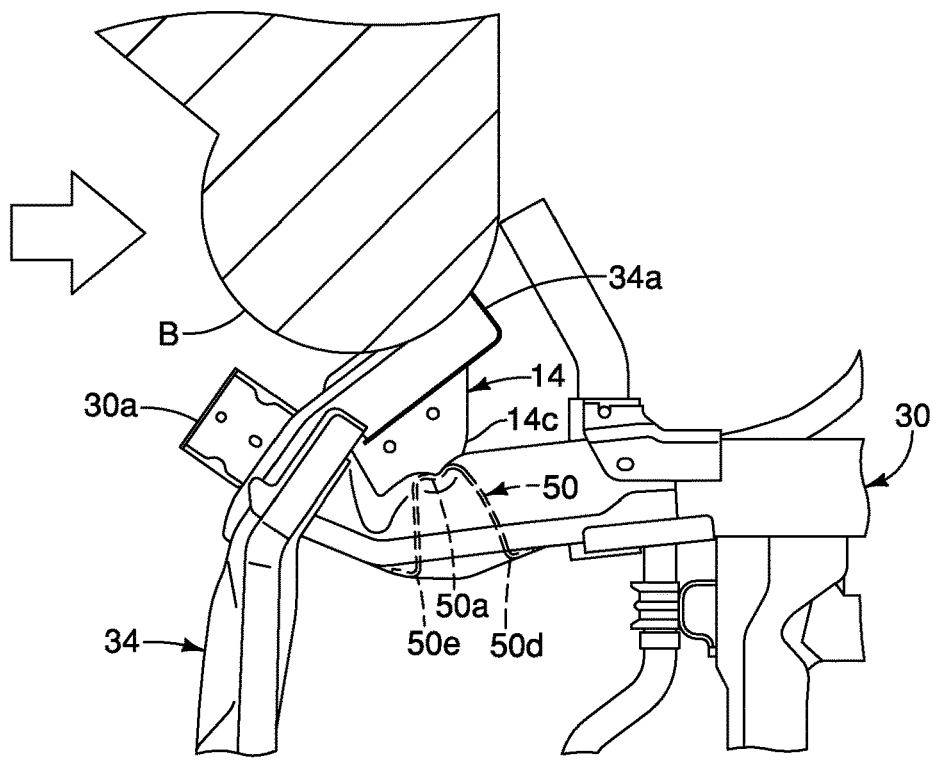
Figure 11:
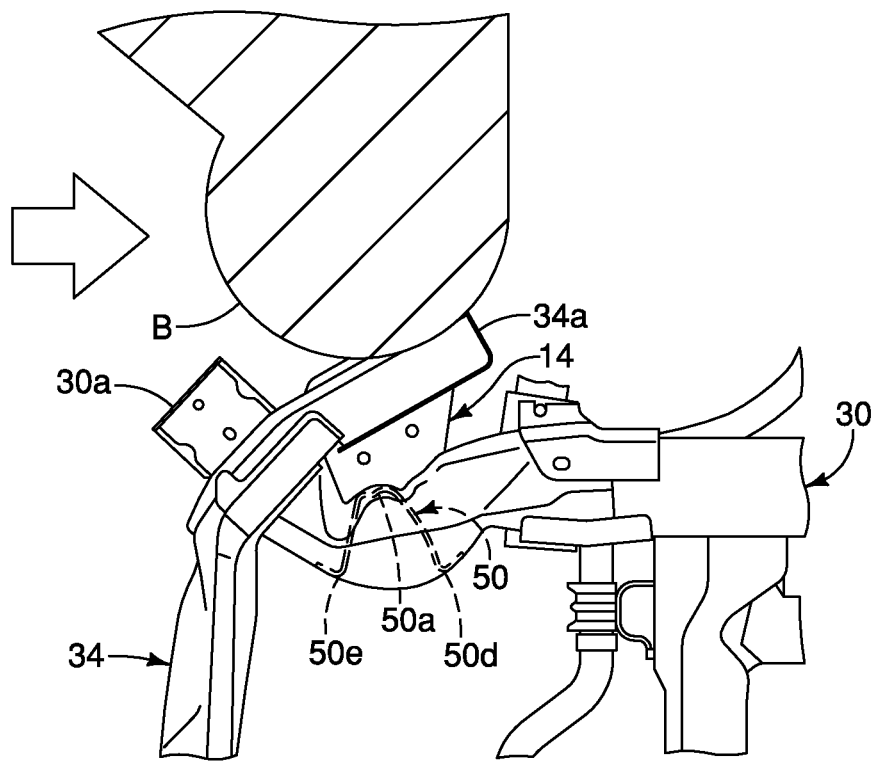

FIGS. 6-11 sequentially illustrate an impact event for the off-center impact structure 14 with a fixed barrier B during the small overlap impact test. During the impact event of the small overlap impact test, the vehicle 10 (FIG. 1) is moved toward the barrier B at a predetermined velocity as shown in FIG. 6. Initially, the fixed barrier B impacts the first outboard portion 34a of the first cross-member 34 of the frame 22. The first outboard portion 34a is configured to bend or otherwise deform such that the off-center impact structure 14 with the load distributing member 48 moves into contact with an outboard side 30f of the first side-member 30, as shown in FIG. 7. Continued movement of the vehicle toward the fixed barrier B causes further bending of the first outboard portion 34a of the first cross-member 34 such that the contact surface 14c of the off-center impact structure 14 rolls along the first side-member 30, as shown in FIGS. 8-11. The continued movement of the vehicle toward the fixed barrier B causes further rolling of the curved contact surface 14c and the load distributing member 48 along the first side-member 30. The curved contact surface 14c increases the contact area with the first side-member 30 during the impact event over the duration of the impact event by continuously changing the contact area, thereby defining a dynamic contact area to facilitate stress distribution and more efficiently absorb energy. The load distributing member 48 facilitates efficiently distributing the load on the first side-member 30 during the impact event. The reinforcing member 50 resists lateral deformation during the small overlap impact test, such that the frame 22 (FIG. 2) more efficiently absorbs energy during the impact event. The off-center impact structure 14, including the load distributing plate 48 and the reinforcing member 50, slows the vehicle 10 (FIG. 1) during the impact event and facilitates pushing the vehicle away from the fixed barrier B, as shown in FIG. 1.

Figure 12:
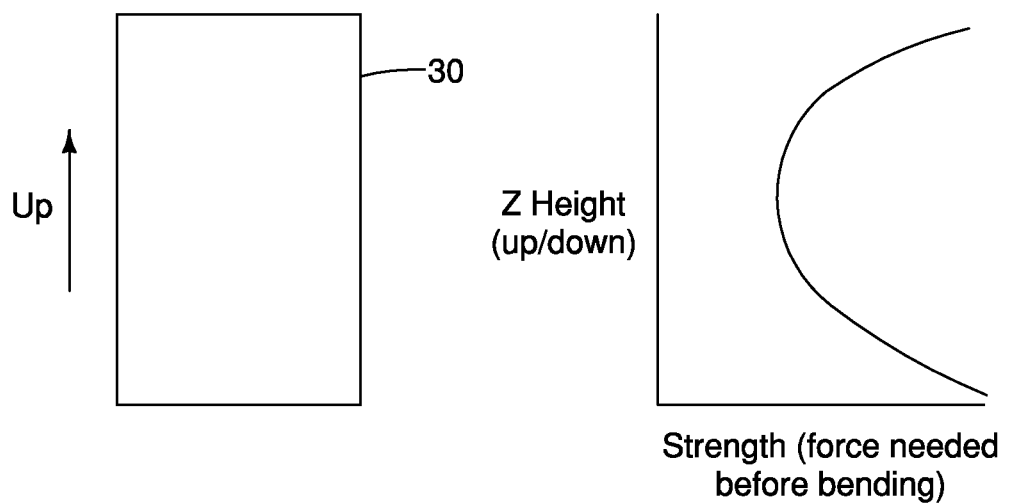
FIG. 12 is a graph illustrating the strength of a frame side-member relative to the off-center impact structure.

The first side-member 30 is strongest at the top and bottom thereof, as shown in the graph on the right-hand side of FIG. 12. The height of the off-center impact structure 14 is preferably at least as large as that of the first side-member 30 to engage the strongest portions of the first side-member 30, thereby more efficiently distributing the load of the impact event on the first side-member 30. The off-center impact structure 14 allows deformation during the impact event of the off-center impact test by keeping a line contact load rather than a point load during the impact event.

Figure 14:
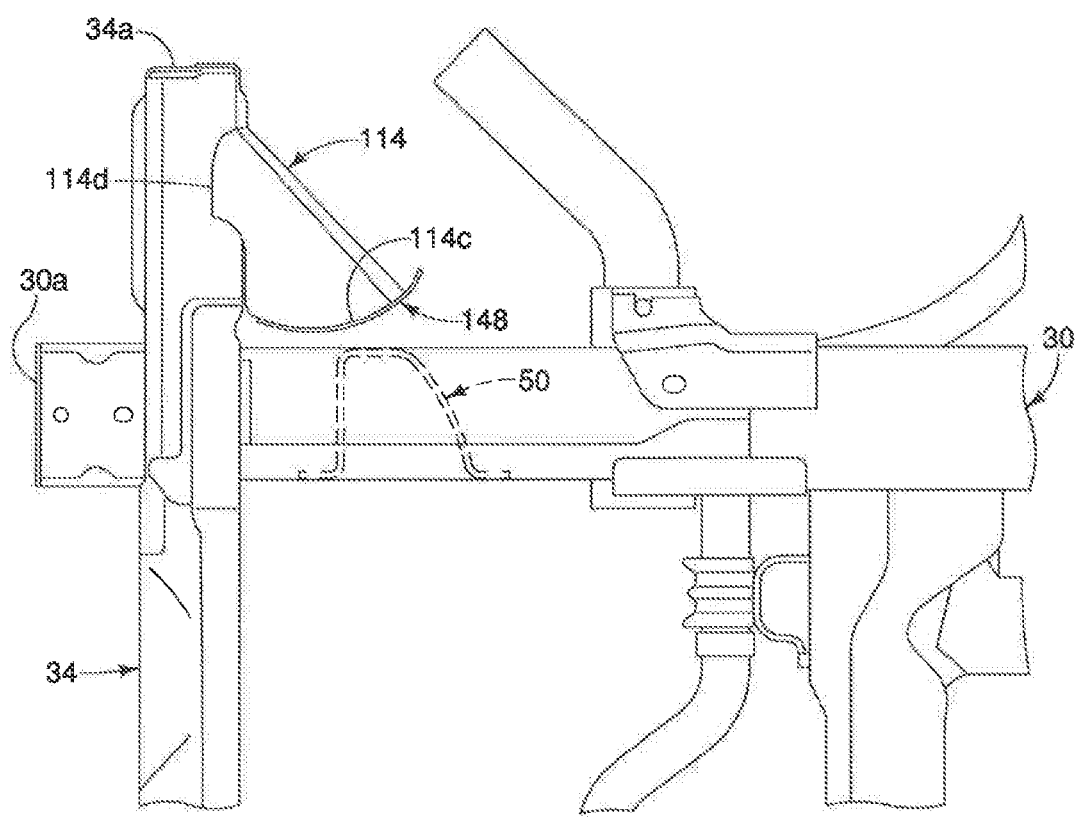
FIG. 14 is a top view of an off-center impact structure in accordance with another exemplary embodiment of the present invention connected to a frame side-member of a vehicle.

Another exemplary embodiment of the off-center impact structure 114 is shown in FIG. 14. The features of the off-center impact structure 114 of FIG. 14 that are substantially similar to the features of the off-center impact structure of FIGS. 2-13 are provided the same reference numerals as the features of the off-center impact structure 14. Moreover, the descriptions of the parts of the off-center impact structure 114 that are identical to the of-center impact structure 14 are omitted for the sake of brevity.

The off-center impact structure 114 includes a first overlapping portion 114d that overlaps an upper surface of the first cross-member 34, as shown in FIG. 14. A second overlapping portion (not shown) overlaps a lower surface of the first cross-member 34 opposite the first overlapping portion 114d. The first and second overlapping portions increase the contact surface area with the first cross-member 34, thereby strengthening the connection with the first cross-member 34.

A curved contact surface 114c is laterally spaced from the first side-member 30, as shown in FIG. 14. The curved contact surface 114c preferably has an involute shape. A load distributing member 148 is connected to the curved contact surface 114c in any suitable manner, such as by welding. The load distributing member 148 has a shape corresponding to the curved contact surface 114c of the off-center impact structure 114. The load distributing member 148 extends rearwardly further than the off-center impact structure 114. The load distributing member 148 is laterally spaced from the first side-member 30. The first cross-member 34 and the load distributing member 148 substantially define a hollow interior of the off-center impact structure 114. The performance of the off-center impact structure 114 is substantially similar to that of the off-center impact structure of FIGS. 2-1 described above during a small overlap impact test.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle body structure. Accordingly, these terms, as utilized to describe the present invention should be interpreted relative to a vehicle equipped with the vehicle body structure.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle frame comprising:
   a first structural member extending in a vehicle lateral direction;
   a second structural member extending in a vehicle longitudinal direction and connected to the first structural member;
   an off-center impact structure connected to at least one of the first and second structural members, the off-center impact structure having a curved contact surface;
   a load distributing member connected to the off-center impact structure, the load distributing member being laterally spaced from the other of the first and second structural members; and
   a reinforcing member disposed in the second structural member such that a line extending parallel to the first structural member passes through the off-center impact structure and the reinforcing member.

2. The vehicle frame according to claim 1, wherein
   the curved contact surface is an involute shape.

3. The vehicle frame according to claim 1, wherein
   the load distributing member is disposed between the off-center impact structure and the second structural member in a top plan view.

4. The vehicle frame according to claim 1, wherein
   the reinforcing member has first and second ends connected to an inner lateral side of the second structural member and a middle portion disposed between the first and second ends connected to an outer lateral side of the second structural member.

5. The vehicle frame according to claim 1, wherein
   the second structural member is disposed between the off-center impact structure and a longitudinal center line of the vehicle in a lateral direction.

6. The vehicle frame according to claim 1, wherein
   a first height of the off-center impact structure is at least as large as a second height of the second structural member.

7. The vehicle frame according to claim 1, wherein
   the load distributing member has a shape corresponding to a shape of the curved contact surface of the off-center impact structure.

8. A vehicle frame comprising:
   a first structural member extending in a vehicle lateral direction;
   a second structural member extending in a vehicle longitudinal direction, the second structural member being connected to the first structural member;
   a body mount connected to the second structural member and configured to receive a vehicle body structure; and
   an off-center impact structure connected to at least one of the first and second structural members, the off-center impact structure having a contact surface,
   the contact surface being spaced from the other of the first and second structural members.

9. The vehicle frame according to claim 8, wherein
   the contact surface is curved.

10. The vehicle frame according to claim 8, wherein
    a load distributing member is connected to the off-center impact structure, the load distributing member extending further rearwardly in the vehicle longitudinal direction then the off-center impact structure.

11. The vehicle frame according to claim 8, wherein
    a reinforcing member is disposed in the second structural member such that a line extending parallel to the first structural member passes through the off-center impact structure and the reinforcing member.

12. The vehicle frame according to claim 8, wherein
    the second structural member extends forward of the off-center impact structure.

13. The vehicle frame according to claim 12, wherein
    at least one crush rib is disposed in the second structural member forward of the off-center impact structure.

14. The vehicle frame according to claim 13, wherein
    the off-center impact structure is substantially hollow.

15. The vehicle frame according to claim 14, wherein
    the off-center impact structure is not integrally formed as a one-piece member.

16. The vehicle frame according to claim 15, wherein
    a height of the off-center impact structure is less than a height of the second structural member.

17. The vehicle frame according to claim 16, wherein
    a longitudinal distance of the load distributing member is substantially equal to a longitudinal distance of the off-center impact structure.

18. The vehicle frame according to claim 17, wherein
    a distance that the first structural member extends outwardly of the second structural member is substantially equal to a distance that the second structural members extends forwardly of the first structural member.

19. The vehicle frame according to claim 18, wherein
    a mounting plate is disposed at a forward end of the second structural member.

20. A vehicle frame comprising:
a first structural member extending in a vehicle lateral direction;
a second structural member extending in a vehicle longitudinal direction, the second structural member being connected to the first structural member;
an off-center impact structure connected to at least one of the first and second structural members, the off-center impact structure having a contact surface spaced from the other of the first and second structural members, the second structural member extending forward of the off-center impact structure; and
at least one crush rib disposed in the second structural member forward of the off-center impact structure, and
a distance that the first structural member extends outwardly of the second structural member being substantially equal to a distance that the second structural members extends forwardly of the first structural member.

* * * * *